(12) United States Patent
Aoki et al.

(10) Patent No.: US 10,088,864 B2
(45) Date of Patent: Oct. 2, 2018

(54) WIRELESS GIMBAL CONNECTION FOR ELECTRONIC DEVICES

(71) Applicant: Intel Corporation, Santa Clara, CA (US)

(72) Inventors: Russell S. Aoki, Tacoma, WA (US); David W. Browning, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 70 days.

(21) Appl. No.: 14/497,534

(22) Filed: Sep. 26, 2014

(65) Prior Publication Data

US 2016/0091924 A1    Mar. 31, 2016

(51) Int. Cl.
*G06F 1/16*    (2006.01)
*F16M 11/20*   (2006.01)

(52) U.S. Cl.
CPC ....... *G06F 1/1616* (2013.01); *F16M 11/2007* (2013.01); *G06F 1/1662* (2013.01); *G06F 1/1683* (2013.01); *G06F 1/1698* (2013.01)

(58) Field of Classification Search
CPC .... G06F 1/1616; G06F 1/1698; G06F 1/1662; F16M 11/2007
USPC .................................................... 361/679.21
See application file for complete search history.

(56) References Cited

U.S. PATENT DOCUMENTS

| | | | | |
|---|---|---|---|---|
| 5,619,195 A * | 4/1997 | Allen | .................... | G05G 9/047 200/6 R |
| 6,170,120 B1 * | 1/2001 | Lu | ........................ | G06F 1/1616 16/331 |
| 7,619,879 B2 * | 11/2009 | Aoyama | ............... | G06F 1/1613 248/920 |
| 7,928,895 B2 * | 4/2011 | Bunch | ..................... | H01Q 3/08 340/5.61 |
| 8,498,100 B1 * | 7/2013 | Whitt, III | ............. | G06F 1/1618 361/679.17 |

(Continued)

FOREIGN PATENT DOCUMENTS

| JP | H0846385 A | 2/1996 |
|---|---|---|
| JP | 2001285424 A | 10/2001 |

OTHER PUBLICATIONS

International Search Report and Written Opinion for PCT Patent Application No. PCT/US2015/047887, dated Dec. 15, 2015, 11 pages.

(Continued)

*Primary Examiner* — Tuan T Dinh
*Assistant Examiner* — Rockshana D Chowdhury
(74) *Attorney, Agent, or Firm* — Jordan IP Law, LLC

(57) ABSTRACT

A wireless gimbal connection of use with electronics devices such as computer notebooks relatively pivotable portions such as a lid and base. The gimbal includes a carriage on which transmitter and receiver chips are mounted, and further has a magnet whose magnetic forces may be used to bring the gimbaled carriage into a predetermined alignment with the base, which may be used to arrange the chips and any sensors as may be used into alignment as well. As the orientation of the lid varies with respect to the base, the carriage within seeks alignment with the base due to the magnetic forces present. Where the base is located on a flat surface, gravitational forces also contribute to the alignment.

25 Claims, 8 Drawing Sheets

(56) References Cited

U.S. PATENT DOCUMENTS

| | | | |
|---|---|---|---|
| 2004/0012920 A1* | 1/2004 | Tanimoto | G06F 1/162 361/679.27 |
| 2006/0282985 A1* | 12/2006 | Lu | G06F 1/162 16/367 |
| 2007/0065158 A1 | 3/2007 | Shindou et al. | |
| 2007/0150764 A1* | 6/2007 | Chen | G06F 1/1616 713/300 |
| 2009/0046707 A1* | 2/2009 | Smires | H04M 7/0069 370/352 |
| 2010/0014235 A1 | 1/2010 | Huang et al. | |
| 2010/0073243 A1* | 3/2010 | Ayala Vazquez | H01Q 1/02 343/702 |
| 2010/0238620 A1 | 9/2010 | Fish | |
| 2011/0110670 A1* | 5/2011 | Atkinson | G06F 1/162 398/135 |
| 2011/0285385 A1* | 11/2011 | Nakamura | G01D 5/145 324/207.11 |
| 2012/0162864 A1* | 6/2012 | Wikander | G06F 1/1681 361/679.01 |
| 2012/0287562 A1 | 11/2012 | Wu et al. | |
| 2012/0313324 A1* | 12/2012 | Frickey | F41J 1/10 273/407 |
| 2013/0175264 A1 | 7/2013 | Lin | |
| 2013/0242495 A1* | 9/2013 | Bathiche | G06F 1/1626 361/679.28 |
| 2013/0321216 A1* | 12/2013 | Jervis | G06F 1/1616 343/702 |
| 2014/0273590 A1 | 9/2014 | Sharma et al. | |

OTHER PUBLICATIONS

European Search Report for European Patent Application No. PCT/US2015/047887, dated May 25, 2018, 13 pages.

* cited by examiner

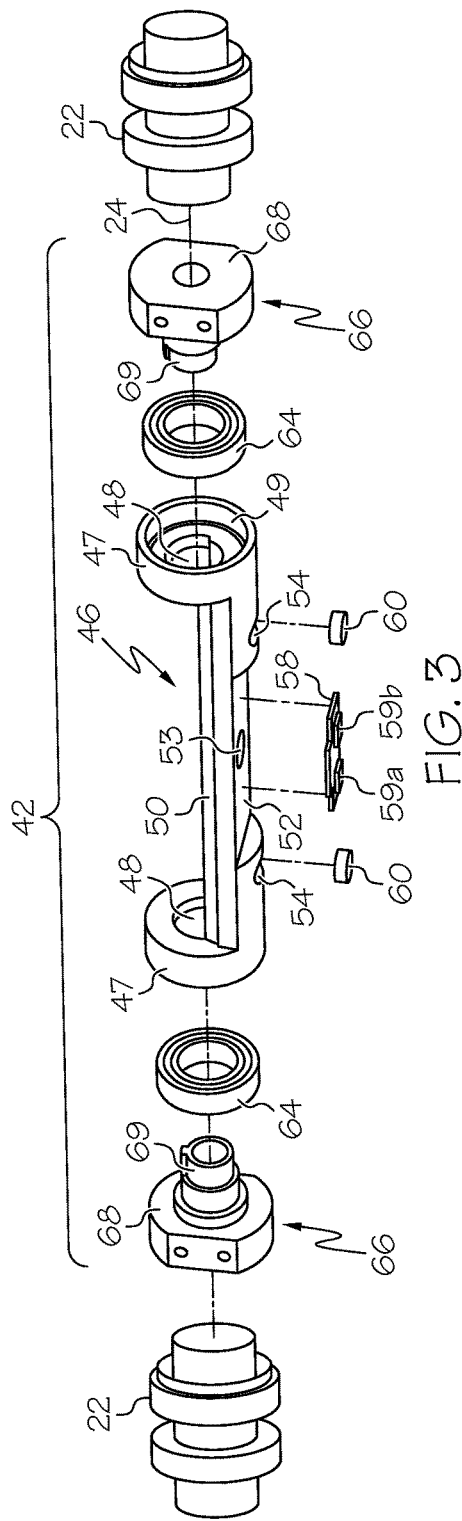
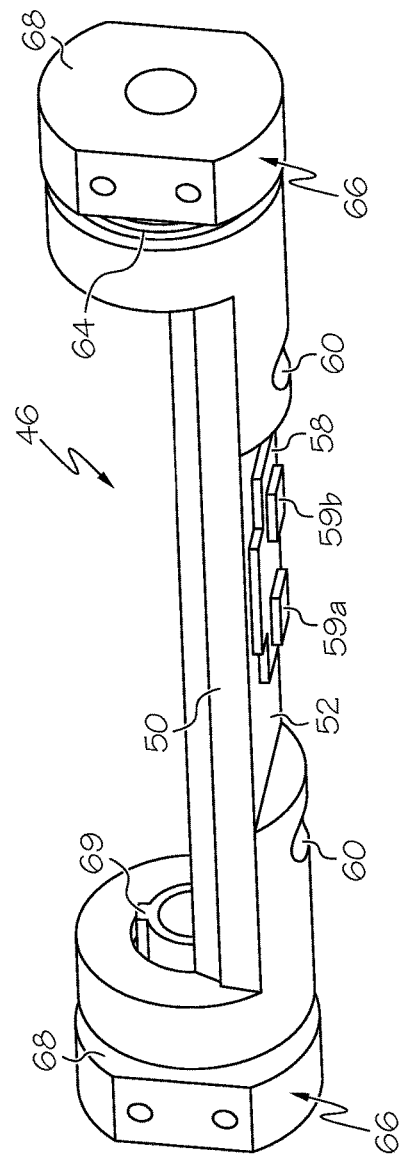
FIG. 3
FIG. 4A

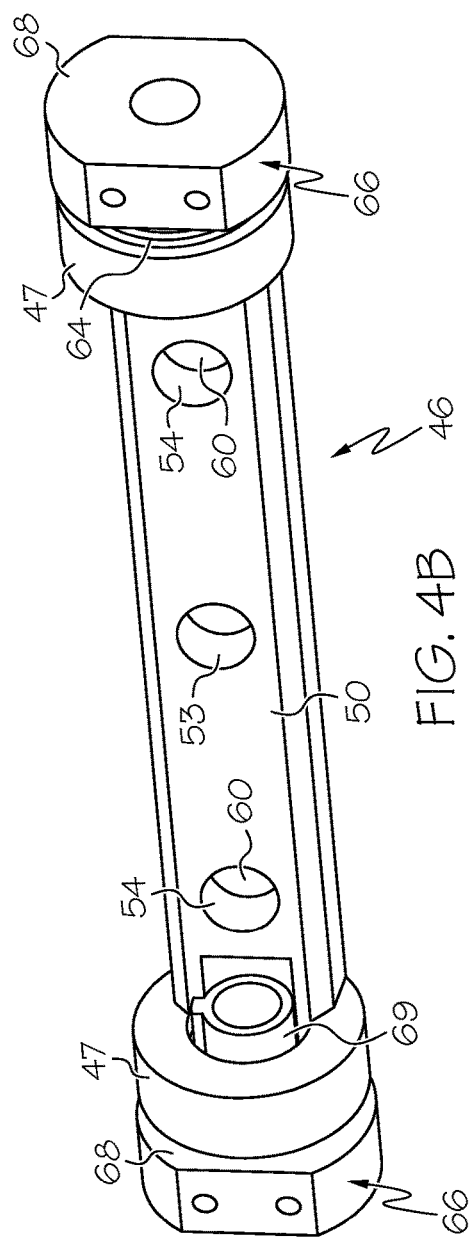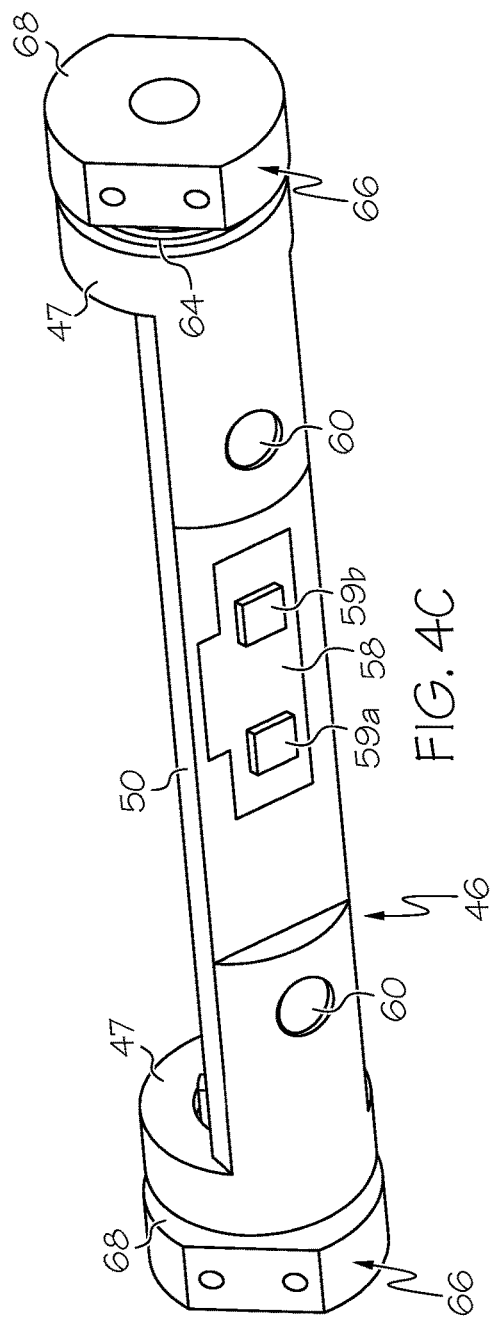

WIRELESS GIMBAL CONNECTION FOR ELECTRONIC DEVICES

TECHNICAL FIELD

Embodiments described herein generally relate to a mechanism having particular use with electronic devices having clamshell form factors, notebook computers, convertible mobile computers, smart phones, tablets, adaptive two-in-one combination notebook and tablet computers, all-in-one desktop computers, and other electronic devices having angularly displaceable or detachable components and related configurations. More particularly, the embodiments relate to establishing wireless connections between such components.

BACKGROUND

Notebook computers, convertible computers that may serve both as desktop and notebooks, notebooks and tablets having interconvertability, combinations thereof, and clamshell-style electronics of all kinds typically may have a lid portion and a base portion. The lid often includes a display and the base a keyboard. In some uses, such as in a so-called two-in-one system, the lid may be a tablet computer operable independently from its detachable base. Should the user wish to use the tablet as a notebook, the user attaches the lid to the base and establishes both a pivotable mechanical connection to it (typically via hinges) as well as various electrical connections between the lid and base. While wires and their associated hardware may be used to establish the electrical connections between the lid and base in such devices, it may be desired that these electrical connection be wireless.

BRIEF DESCRIPTION OF THE DRAWINGS

The various advantages of the embodiments will become apparent to one skilled in the art by reading the following specification and appended claims, and by referencing the following drawings, in which:

FIG. 3 is a further exploded view of an example of a gimbal assembly according to one embodiment;

FIG. 4A is a substantially side perspective view of the example of a gimbal assembly depicted in FIG. 3 in an assembled state;

FIG. 4B is a substantially top perspective view of the example of the gimbal assembly depicted in FIG. 4A;

FIG. 4C is a substantially bottom perspective view of the example of the gimbal assembly depicted in FIG. 4A and FIG. 4B;

DESCRIPTION OF EMBODIMENTS

Notebook computers, personal electronics such as smart phones having clamshell form factors, two-in-one convertible computer tablets and all-in-one systems may present parts that pivot with respect to one another. The relatively pivotable parts, in addition to being mechanically connected to one another as via a hinge, may also include an electrical connection across which one or more electrical circuits are maintained for communications purposes. Some of these platforms, such as certain adaptive two-in-one computer tablets, may further comprise component portions such as a base and lid that are separable from one another. In these and similar such devices it may be useful to provide an electronic linkage between their pivotable portions. Wired connectors exist for this purpose, but they may fail, or may present problems of assembly.

The embodiments disclosed herein provide structure that facilitates a wireless connection to serve as a linkage between pivotable portions, and are of use in a variety of settings. The wireless connection may be established by using radio transmitter and receiver chips that may benefit from a dynamic line-of-sight alignment between them, such as in platforms where there the two portions of the device are pivotable with respect to one another. The alignment is said to be "dynamic" in such cases because of the varying pivot angle that may be encountered. Presented here are embodiments that provide dynamic alignment by implementing a wireless connection gimbal assembly to wirelessly connect at least one matched pair of receiver and transmitter. The gimbal assembly utilizes magnetic forces and may additionally utilize gravity to establish an alignment that provides a line of sight path between corresponding transmitter and receiver chips. One of the chips is connected to the gimbal assembly and rotates with it, whereas the other is not attached to the gimbal assembly.

Figure 1:
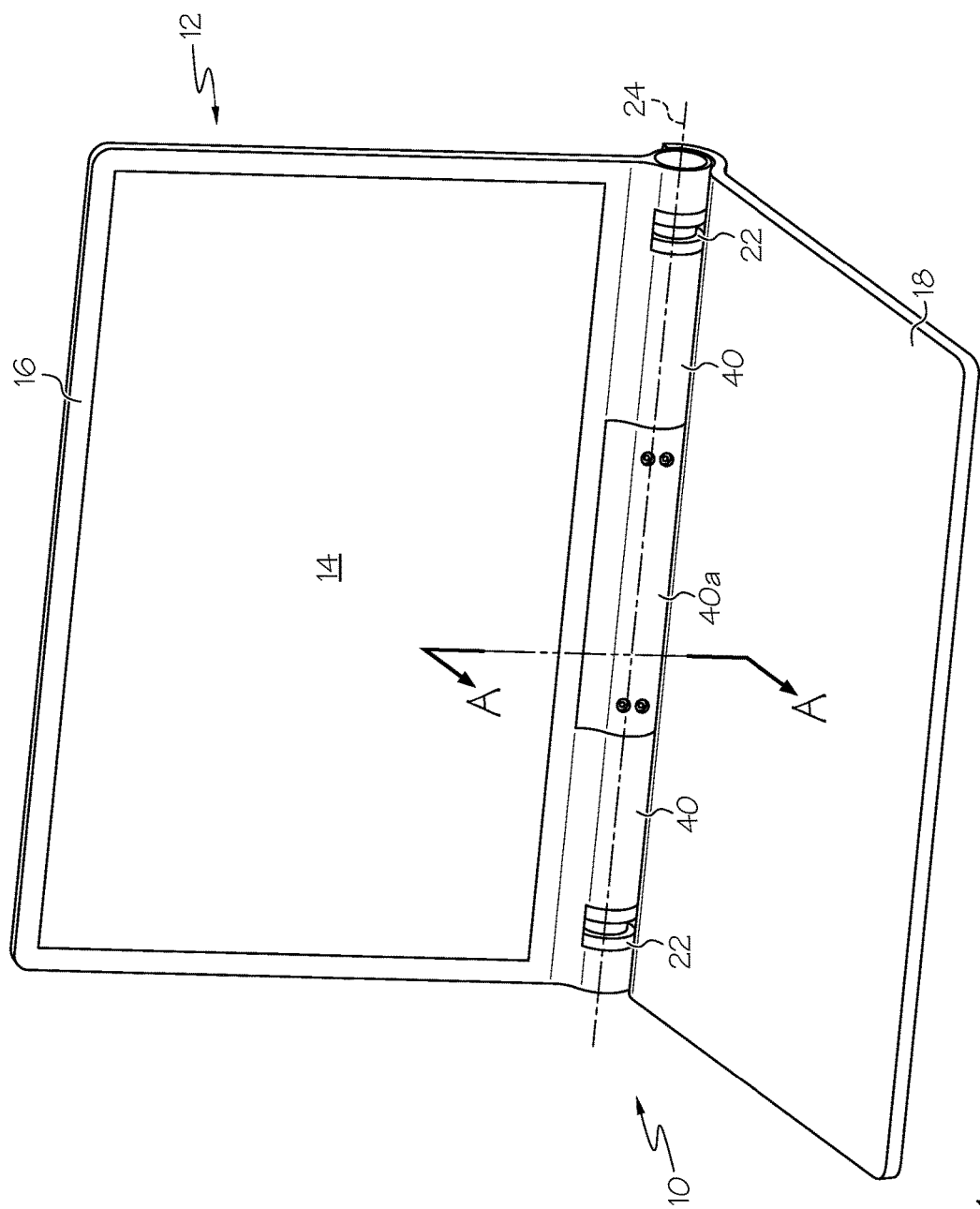
FIG. 1 is a perspective view of an example of an computer having pivotally displaceable portions in wireless communication with one another according to an embodiment.
Figure 2:
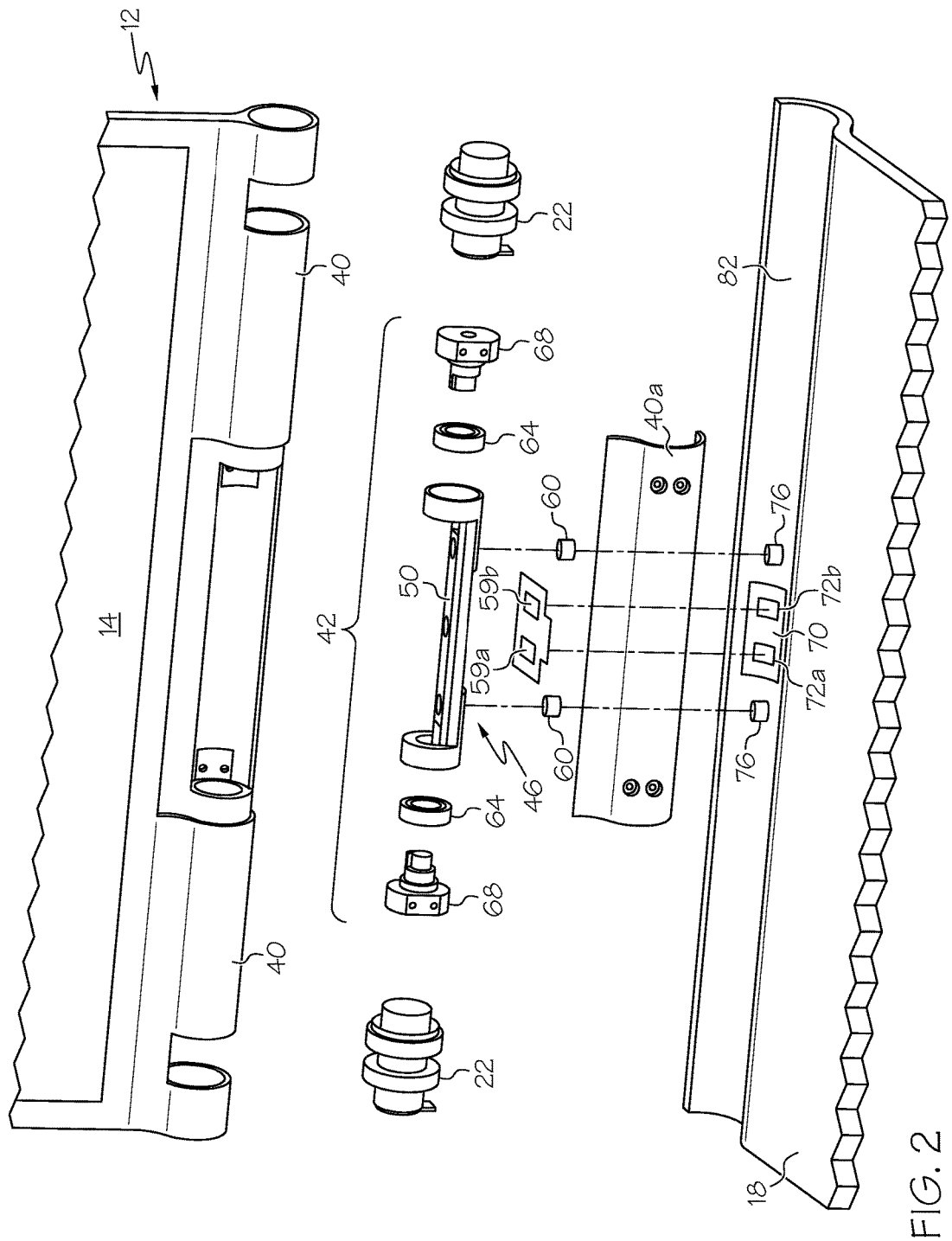
FIG. 2 is a schematic and partially exploded view of an example of a computer having a wireless connection gimbal assembly constructed according to an embodiment.

FIGS. 1 and 2 depict an embodiment in which a notebook computer 10 has a lid 12 comprising a display 14 surrounded by a bezel 16, and a base 18. The lid 12 is connected to a base 18 via a pair of hinges 22 that pivot about a pivot axis 24. The hinges provide a pivotable mechanical connection between the lid 12 and base 18, and may be a detachable type or may provide a more permanent mechanical connection. In addition to this mechanical connection, a wireless electrical connection is established between the base 18 and the lid 12 via a gimbal assembly 42 housed within a barrel housing 40.

FIG. 2 illustrates further details of the gimbal assembly 42 in relation to the lid 12 and a central portion of the base 18. For illustrative purposes the portions are shown in partially exploded form and with the gimbal assembly 42 removed from its barrel housing 40 and its barrel cover 40a detached.

In the illustrated embodiment, the barrel cover may be made of a material that is substantially permeable to magnetic lines of force, such as plastic.

Referring now to FIG. 3, at the center of the gimbal assembly 42 is a rotatable carriage 46 having a central portion 50 that extends between ring portions 47 located on either end of the central portion 50. Each of the ring portions 47 has a centrally located hole 48 and a recess 49. The central portion 50 may take a variety of shapes, including a half cylinder, a bar, or a full cylinder. According to the embodiment shown in FIG. 3 and FIGS. 4A-4C, the central portion 50 has a recessed cutout section 52 to receive a printed circuit board 58, as is discussed below. It may further include two holes 54 on either side of the cutout section 52 to receive magnets 60, and may optionally include a centrally located hole 53 to accommodate wiring to the printed circuit board 58. The number and location of the magnets 60 and holes 54 shown in the embodiment is for illustrative purposes only. More or fewer magnets and holes may be used. The carriage 46 may be made of a polymer or other non-magnetic material so as not to separately interact with the action of the magnets, or it may include ferromagnetic materials such as steel to attract magnets in the base 18 for purposes that shall be further explained below.

In the illustrated embodiment, a pair of roller bearings 64 may be press-fitted into the corresponding recesses 49 located at the ends of the carriage 46. As is further illustrated in FIGS. 4A-4C, on each side of the carriage 46 is a spindle 66 having a base 68 and an axially protruding pivot 69 that may be inserted into one of the roller bearings 64 and further into a hole 48 of the carriage ring portions 47. When assembled as in FIGS. 4A-4C, the carriage 46 has a gimbal connection to the pivots 69 of the spindles 66 and may freely rotate about the pivot axis 24. (In other embodiments, stops, not further shown here, may be provided to limit the rotation of the carriage 46 to ninety degrees in either direction so as to facilitate cable routing to the printed circuit board 58.) Such other structures as may be attached to the carriage 46 are also free to rotate with the carriage 46 about the pivot axis 24 as well. The bases 68 of the spindles 66 may be fixedly attached to the hinges 22, to the base 18, or to the lid 12, depending on the particular platform design. Although the carriage 46 is free to rotate about the pivot axis 24, it may be constrained against further axial movement along the pivot axis 24 by the spindles 66.

Other bearing arrangements may be used, provided that they permit the substantially free rotation of the carriage 46 about the pivot axis 24. For example, in other embodiments in which the spindles have suitably low coefficients of surface friction, the roller bearings may be dispensed with, and a direct gimbal connection established between the carriage 46 and the spindles 66.

Wireless communications between the lid and the base may entail the use of a short range wireless connection to provide a communications channel between them. Such a connection may be made via a number of wireless technologies using circuits and integrated circuit (IC) chips mounted to a printed circuit board. This entails the use of at least one transmitter chip or circuit, and at least one corresponding receiver chip or circuit. In some embodiments, each side of the communications channel may have its own transmitter chip and its own receiver chip, a plurality of transmitter and receiver chips, or transceiver chips capable of both transmitting and receiving. Among the technologies currently available to implement short range wireless communications between lid and base is Ultra-Wideband, which operates in the 60 GHz range. At such frequencies, communications are essentially line-of-sight, and the better the alignment between corresponding transmitter and receiver chips, the less power that is used to accurately send a given message in a given interval of time across the space between them. This may lead to noticeable power savings, which is of benefit in most portable systems. Hence it is desirable that in use, these chips be brought into a closely spaced, facing alignment with one another.

Figure 5:
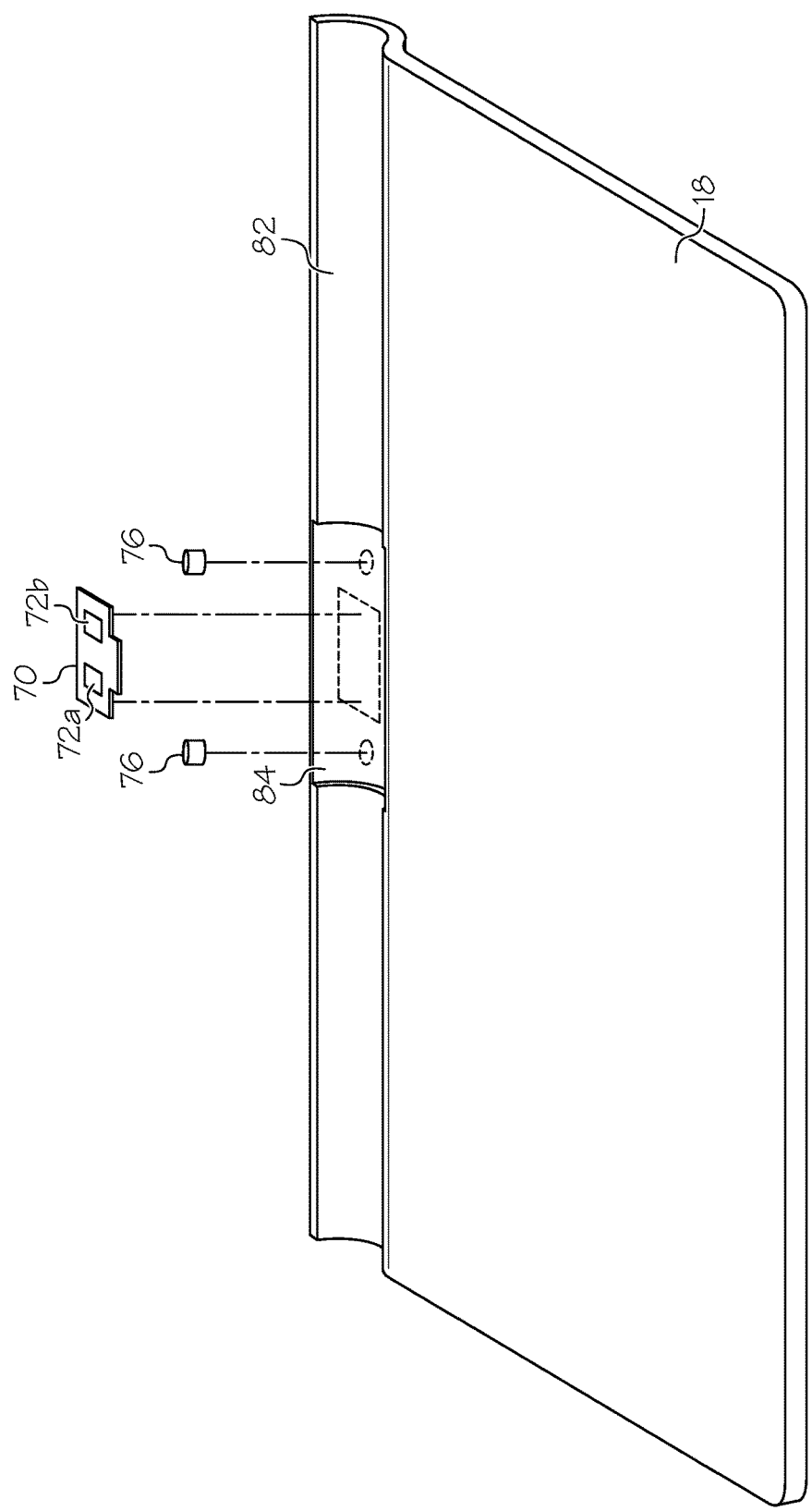
FIG. 5 is a partially cutaway and exploded view of an example of a portion of a base according to an embodiment.

In the embodiment illustrated in FIGS. 3 and 4, the central portion 50 of the carriage 46 includes a recessed cutout section 52 that accommodates a printed circuit board 58 on which are one or more transmitter chips 59a and receiver chips 59b. (In an alternative embodiment, transceiver chips may be used.) As is shown in FIGS. 2 and 5, a printed circuit board 70 mounted to base 18 is provided with a corresponding set of receiver chips 72a and transmitter chips 72b. In this embodiment, base 18 has an curved, half-pipeline-like edge section 82 into which lid 12 and hinges 22 may be connected to the base via a snap fit, a magnetic attachment mechanism, or other attachment mechanism. The edge section 82 may be provided with an interior plenum 84 within which is fixed the printed circuit board 70 as well as a pair of magnets 76 located on either side of the printed circuit board 70. The polarities of the magnets 76 and 60 are arranged so that they attract rather than repel one another, and they are sited so as to occupy axially corresponding locations in the base 18 and lid 12 respectively, as may be seen in FIG. 2. The magnets are also axially aligned with the transmitter and receiver chips of their respective printed circuit boards 58 and 70 so that they face one another and have a line-of-sight path between them when the magnets are facing one another.

It will be appreciated that in use, the carriage 46 is part of a gimbal assembly, and is free to rotate in either direction about its pivots 69 in response to the forces that are applied to it. These forces are the magnetic forces supplied by the magnets, and gravity. The magnetic forces of attraction contributed by the pairs of magnets 60 and 76 gimbal the chips on the carriage into proper alignment with the corresponding chips in the base. In this manner the chips are brought into correct alignment even as the orientation of the lid with respect to the base may vary.

One additional benefit of the use of magnets is that if they are sufficiently strong, they may compensate for misalignment of chips that may result when the base is not resting on a flat surface. Even when the base is tilted, magnetic forces act to bring the transmitter and receiver chips into line-of-sight alignment with one another.

Additionally, gravity provides a secondary force urging the carriage 46 and its chips into a downward orientation, pointing towards the base and its receiver and transmitter chips. This is due both to the weight and shape of the carriage 46, as well as the additional weight of the printed circuit board 58 and the two magnets 60.

The gimbal assembly 42, by allowing the carriage 46 to rotate within the barrel housing 40, thus utilizes the magnetic and (to a lesser degree) gravitational forces to urge the transmit and receive chips on the printed circuit board 58 into alignment with the corresponding chips on the printed circuit board 70 in the base 18.

Figure 6A:
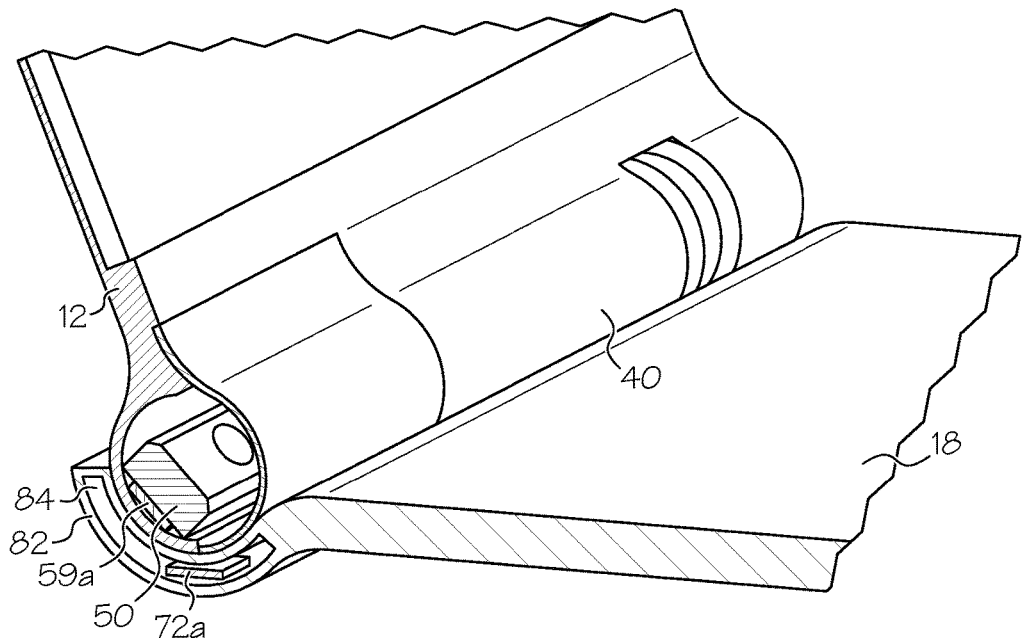
FIG. 6A is a sectional view taken along line A-A of FIG. 1 of an embodiment of an electronic device showing an orientation of two chips at a first moment according to an embodiment.
Figure 6B:
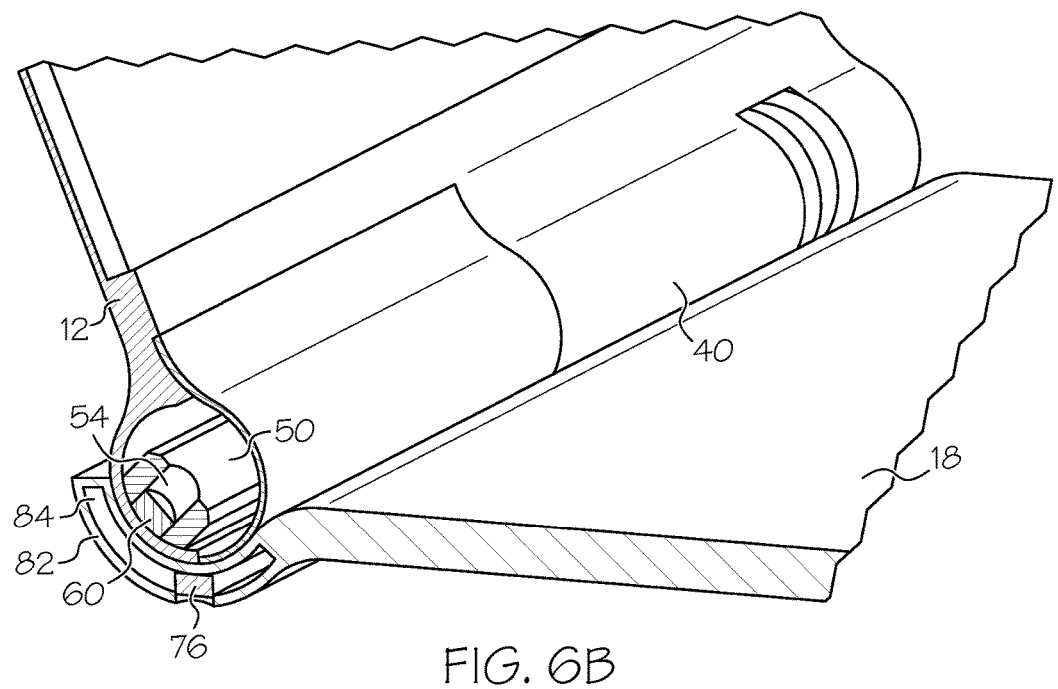
FIG. 6B is a sectional view taken along line A-A of FIG. 1 of an embodiment of an electronic device showing an orientation of two magnets at the moment depicted in FIG. 6A according to an embodiment.
Figure 7A:
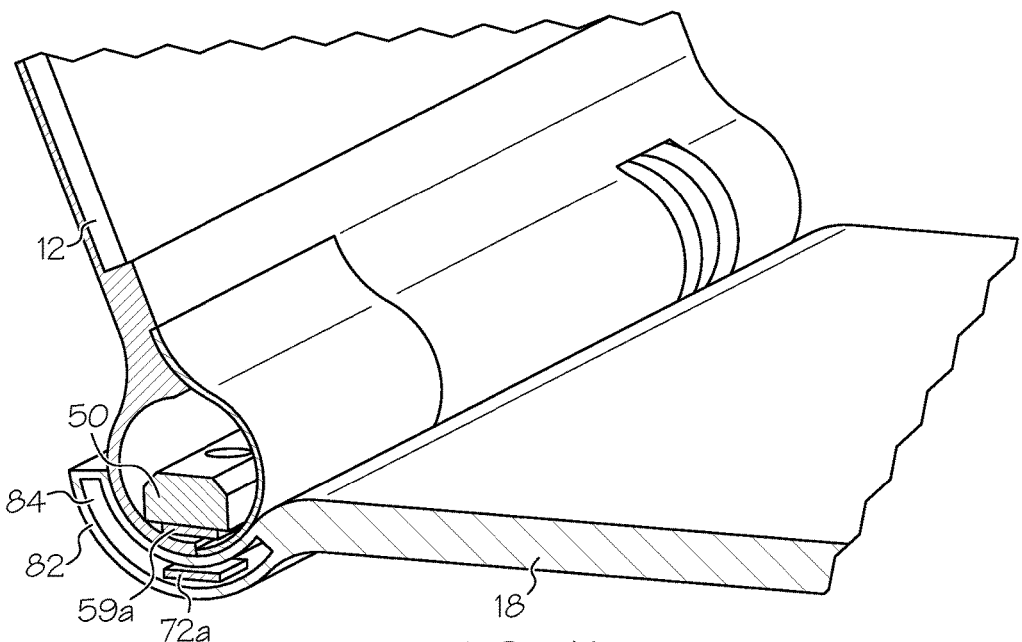
FIG. 7A is a sectional view taken along line A-A of FIG. 1 of an embodiment of an electronic device showing an orientation of two chips at a later moment according to an embodiment.
Figure 7B:
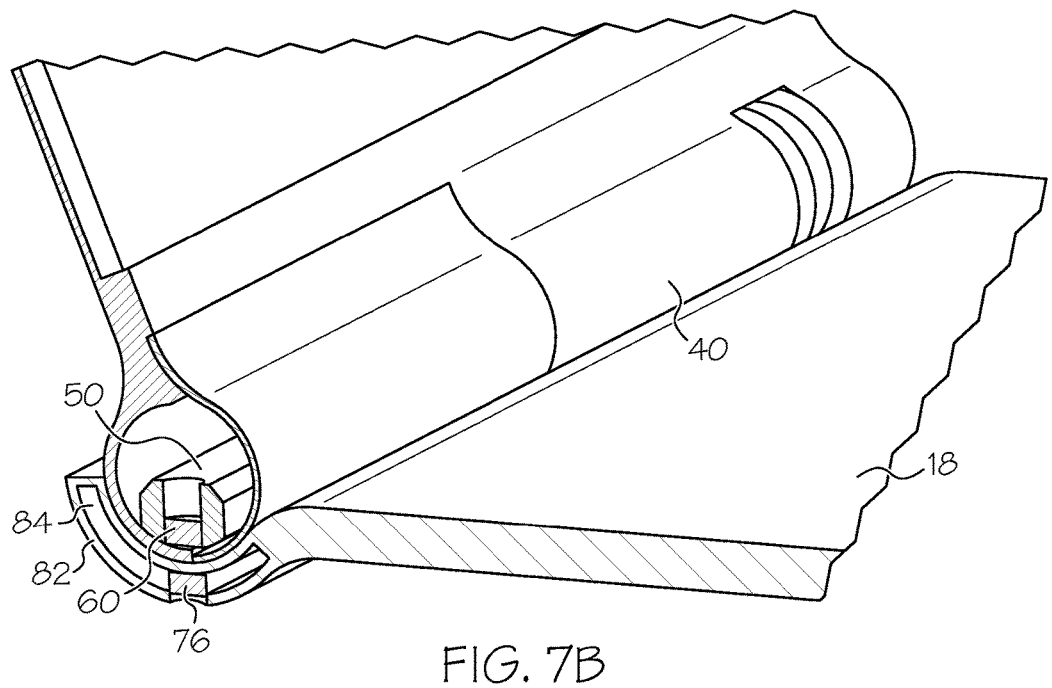
FIG. 7B is a sectional view taken along line A-A of FIG. 1 of an embodiment of an electronic device showing an orientation of two magnets at the later moment depicted in FIG. 7A according to an embodiment.
Figure 8A:
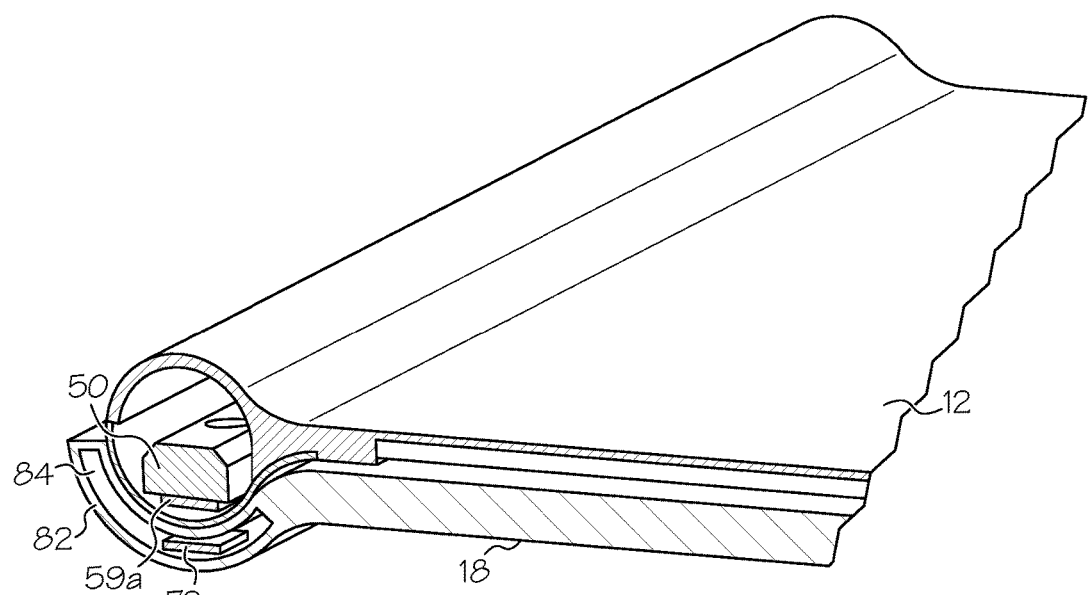
FIG. 8A is a sectional view of an embodiment of an electronic device showing the orientation of two chips with respect to one another when the device is closed.
Figure 8B:
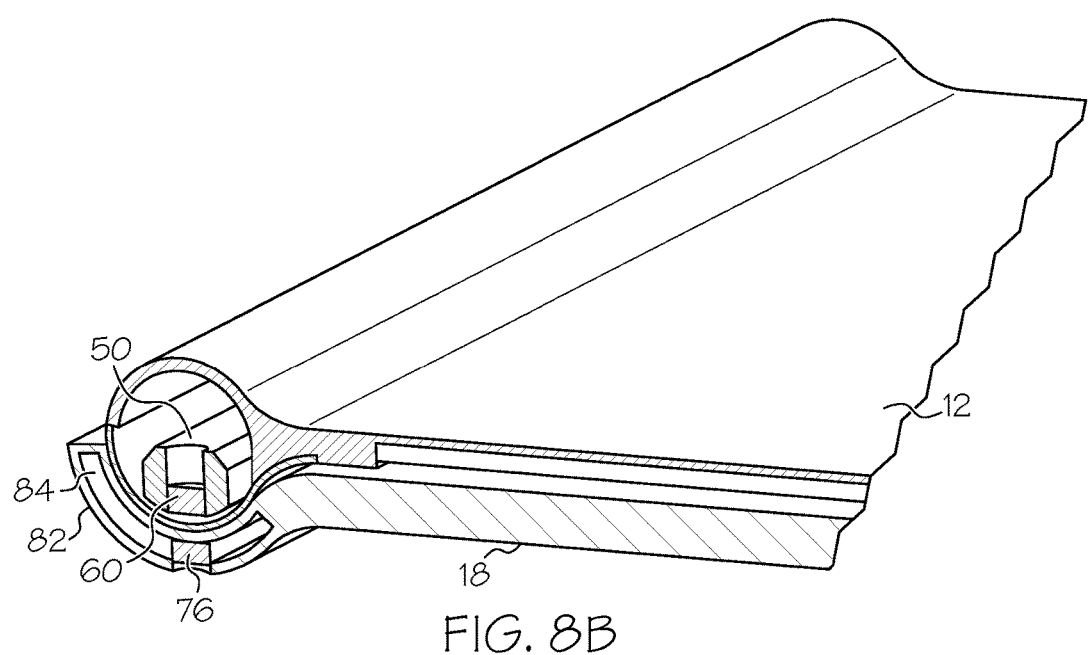
FIG. 8B is a sectional view of an embodiment of an electronic device showing the orientation of two magnets with respect to one another when the device is closed.

Turning now to FIGS. 6A and 6B, a sectional view of an embodiment is shown with the lid 12 at the moment it has been pivoted with respect to the base 18. At this depicted moment, the chips 59 in the lid may not be in alignment with the corresponding chips 72 in the base, and there may be no line-of-sight path between them. Similarly, the magnets 60 and 76 may not be aligned either (FIG. 6B). However, the magnetic forces between the corresponding pairs of magnets 60 and 76 swiftly bring the chips into line-of-sight alignment, as is shown in FIGS. 7A and 7B. Simultaneously and additionally, gravity acts to orient the carriage 46 so that its magnets and the chips it carries point in a downward direction to the magnets 76 and chips 72 in the base 18. Should the lid be further pivoted, the rotatable carriage 46 pivots, and the gimbal maintains a line of sight alignment among the corresponding pairs of chips via magnetic and, to a lesser extent, gravitational forces. This arrangement allows the wireless transmitter chips on either side to maintain a line-of-sight alignment to the receiver chips on the other side. By maintaining such an alignment, the transmitter chips may use less transmit power as power need not be wasted due to misalignment. This enhanced alignment may also be utilized to increase the data-rate that may be effectively transmitted, as less data is lost in wireless transmission between the lid and base.

Additionally, in those situations where the base may not be resting on a horizontal surface, the magnetic field of the magnets may suffice to provide proper alignment even where gravity does not.

In another embodiment, instead of magnets on the base 18, a strip of steel or other suitable magnetic material may be employed to provide for an attractive force. Various combinations and arrangements of magnets and magnetic materials such as steel may be used in either or both of the base and carriage to establish the desired magnetic force.

In still other embodiments, the carriage may itself not have a center of gravity that is displaced from the pivot axis, and may, for example, be cylindrical. Nevertheless, by adding weights to one side of the carriage (e.g., via the magnets or the addition of a steel bar), a net gravitational moment may be provided to use gravity as a tool to align the chips.

In several of the embodiments illustrated here, the gimbal assembly is shown attached to the lid. However, in other embodiments, the gimbal assembly including its magnets and circuits may be integrated into the base, with corresponding facing circuits and magnets provided along an adjacent portion of the lid.

ADDITIONAL NOTES AND EXAMPLES

Example 1 may include an electronic device having pivotable portions comprising a first portion, a second portion pivotally connected to the first portion about a pivot axis, a carriage pivotally attached to the first portion about a gimbal axis, at least one receiver attached to said carriage, and at least one transmitter attached to the second portion. Example 1 also has at least one magnet attached to the carriage, and at least one magnet attached to the second portion so that a magnetically attractive force exists between the carriage and the second portion. The magnets are positioned so that they urge the transmitter and the receiver into alignment with one another by rotating the carriage about the gimbal axis.

Example 2 may include the electronic device of Example 1, wherein the electronic device is a computer, the first portion comprises a display and the second portion comprises a base.

Example 3 may include the electronic device of Example 2, wherein the first and second portions are detachable from one another.

Example 4 may include the electronic device of Example 1, wherein the carriage has a center of gravity that lies below the gimbal axis.

Example 5 may include the electronic device of Example 1, wherein the carriage comprises a central portion bound by two spaced apart ring portions, the centers of the ring portions defining a carriage axis, and wherein the central portion comprises at least one hole to accommodate a magnet.

Example 6 may include the electronic device of Examples 1 or 5, further comprising a circuit board wherein the transmitter is a transmitter chip and the receiver is a receiver chip and each of said chips is mounted to said circuit board. The circuit board is attached to the central portion of the carriage.

Example 7 may include the electronic device of Example 5, wherein the gimbal axis is coincident with the carriage axis.

Example 8 may include the electronic device of Example 1, wherein at least one transmitter and receiver are arranged so as to be in line-of-sight with one another across a plurality of pivot angles between the first portion and the second portion.

Example 9 may include the electronic device of Example 1, further comprising a ferromagnetic material to attract at least one of the magnets.

Example 10 may include the electronic device of Example 1, further comprising a bearing connected to each ring portion, and two spindles. A spindle is engaged with one of each of said bearings.

Example 11 may include the electronic device of Examples 1 or 5, wherein the first portion of the electronic device comprises a display, the second portion of the electronic device comprises a keyboard, and wherein the spindles are connected to the first portion so that the carriage may gimbal with respect to the first portion.

Example 12 may include the electronic device of Example 1, wherein the first portion is a computer tablet.

Example 13 may include the electronic device of Example 1, wherein at least one of the magnets is made of a ferromagnetic material.

Example 14 may include a gimbal assembly of use with an electronic device having relatively pivotable first and second portions. It comprises first and second gimbal pivots defining a gimbal axis therebetween, first and second bearings that are connected to the first and second gimbal pivots, a carriage having a central portion bound by first and second end portions that are attached to the first and second bearings so as to permit the carriage to rotate about the gimbal axis, and a first magnet that is attached to the central portion of the carriage. Additionally, a first circuit board having a transmitter circuit and/or a receiver circuit is attached to the central portion of the carriage. In this Example, the gimbal assembly is attached to a pivotable portion of an electronic device.

Example 15 may include the gimbal assembly of Example 14, wherein the first and second bearings are roller bearings and the gimbal pivots are part of spindles.

Example 16 may include the gimbal assembly of Example 14, further comprising a second circuit board having a receiver circuit and/or a transmitter circuit, the second circuit board being attached to that portion of the electronic device to which the gimbal assembly is not attached.

Example 17 may include the gimbal assembly of Examples 14-16, comprising a second magnet arranged on a portion of the electronic device so as to permit an attractive magnetic force between the first and second magnets capable of rotating the carriage.

Example 18 may include an apparatus to enable a wireless connection between relatively pivotable first and second portions of a computer system, comprising a carriage pivotally attached to a first portion of a computer system about a gimbal axis; a receiver circuit and a transmitter circuit that are attached the carriage; a transmitter circuit and a receiver circuit that are attached to a second portion of a computer system; at least one magnet and/or a magnetic material attached to the carriage; and at least one magnet and/or a magnetic material attached to the second portion so that there exists a magnetic attraction urging the carriage towards the second portion.

Example 19 may include the apparatus of Example 18, wherein the receiver and transmitter circuits of the carriage are so positioned on the carriage that they face the receiver and transmitter circuits of the second portion.

Example 20 may include a method of manufacturing a device, comprising providing a first magnet, a first transmitter, and a first receiver on a carriage that has a gimbal connection with respect to a first pivotable section. A second magnet, a second transmitter, and a second receiver are attached to a to a second pivotable section, and an attractive force between the magnets brings the first and second receivers and transmitters into line-of-sight alignment with one another.

Example 21 may include the method of Example 20, wherein the carriage has a center of mass and is pivotable about an axis that is displaced from the center of mass.

Example 22 may include the method of Examples 20-21, wherein magnetic forces bring at least one transmitter and receiver into line-of-sight alignment with one another.

Example 23 may include the method of Example 20, further comprising providing bearings to facilitate rotation of the carriage.

Example 24 may include the method of Example 23, wherein the bearings are roller bearings.

Example 25 may include the method of Example 20, wherein the device comprises a tablet and a detachable base.

Example 26 may include a gimbal assembly for use with an electronic device having relatively pivotable first and second portions, comprising a carriage having first magnetic means, means for providing a gimbal connection of the carriage to the first pivotable portion, and radio means attached to the carriage and to the second pivotable portion. Magnetic means are attached to the second pivotable means so that magnetic attraction between the magnetic means brings the radio means of the carriage into facing alignment with the radio means of the second pivotable portion.

Example 27 may include the gimbal assembly of Example 26, wherein the radio means comprises ultra-wideband circuitry.

Example 28 may include the gimbal assembly of Example 27, wherein both magnetic and gravitational forces urge the radio means of the carriage into alignment with the radio means of the second portion.

Example 29 may include an apparatus to establish a wireless channel in a computer system having relatively pivotable first and second sections. It comprises a carriage that has means for providing a gimbal connection with respect to a first pivotable section, wherein first radio means and first magnet means are attached to the carriage, and second magnet means and second radio means both attached to a second section. An attractive force between the magnets brings the first and second radio means into line-of-sight alignment with one another.

Example 30 may include the apparatus of Example 29, wherein the carriage has a center of mass and is pivotable about an axis that is displaced from the center of mass.

Example 31 may include the apparatus of Examples 29-30, wherein both gravitational and magnetic forces bring corresponding radio means into line-of-sight alignment with one another.

Example 32 may include the apparatus of Example 29, wherein the computer system is a notebook.

Example 33 may include the apparatus of Example 29, wherein the computer system comprises a tablet and a base with respect to which the tablet is detachable.

Example 34 may include the apparatus of Example 29, wherein the computer system is convertible among a plurality of industrial designs.

Example 35 may include the apparatus of Example 29, wherein the radio means comprise ultra wideband chips.

Those skilled in the art will appreciate from the foregoing description that the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic device comprising:
   a first portion;
   a second portion pivotally connected to the first portion about a pivot axis;
   a carriage pivotally attached to the first portion about a gimbal axis;
   at least one receiver attached to said carriage;
   at least one transmitter attached to the second portion;
   at least one magnet attached to the carriage; and
   at least one magnet attached to the second portion so that a magnetically attractive force exists between the carriage and the second portion;
   wherein the at least one magnet attached to the carriage and the at least one magnet attached to the second portion are positioned to urge the at least one transmitter and the at least one receiver into alignment with one another by rotating the carriage about the gimbal axis,
   wherein the carriage includes surfaces defining a recessed cut-out portion to receive a circuit board, and surfaces defining at least one hole are located adjacent to the recessed cut-out portion to accommodate the at least one magnet attached to the carriage,
   wherein the carriage comprises a central portion bound by ring portions, and
   wherein the first portion comprises a display and the second portion comprises a base.

2. The electronic device of claim 1, wherein the electronic device is a computer.

3. The electronic device of claim 2, wherein the first portion and the second portion are detachable from one another.

4. The electronic device of claim 1, wherein the carriage has a center of gravity that lies below the gimbal axis.

5. The electronic device of claim 1, wherein
   the central portion is bound by two spaced apart ring portions, the centers of the two spaced apart ring portions defining a carriage axis, and
   wherein the central portion comprises the at least one hole to accommodate the at least one magnet.

6. The electronic device of claim 5, wherein the transmitter comprises a transmitter chip and the receiver comprises a receiver chip and each of the transmitter chip and the receiver chip is mounted to said circuit board, and wherein the circuit board is attached to the central portion of the carriage.

7. The electronic device of claim 5, wherein the gimbal axis is coincident with the carriage axis.

8. The electronic device of claim 1, wherein the at least one transmitter and the at least one receiver are arranged so as to be in line-of-sight with one another across a plurality of pivot angles between the first portion and the second portion.

9. The electronic device of claim 1, further comprising a ferromagnetic material to attract at least one of the at least one magnet attached to the carriage and the at least one magnet attached to the second portion.

10. The electronic device of claim 1, further comprising:
a bearing connected to each ring portion; and
two spindles, wherein a spindle is engaged with the bearing.

11. The electronic device of claim 1, wherein the first portion of the electronic device comprises a display, the second portion of the electronic device comprises a keyboard, and wherein spindles are connected to the first portion so that the carriage may gimbal with respect to the first portion.

12. The electronic device of claim 1, wherein the first portion is a computer tablet.

13. The electronic device of claim 1, wherein at least one of the at least one magnet attached to the carriage and the at least one magnet attached to the second portion is made of a ferromagnetic material.

14. A gimbal assembly of use with an electronic device having relatively pivotable first and second portions, comprising:
first and second gimbal pivots defining a gimbal axis therebetween; first and second bearings that are connected to the first and second gimbal pivots;
a carriage having a central portion bound by ring portions that are attached to the first and second bearings so as to permit the carriage to rotate about the gimbal axis;
a first magnet that is attached to the central portion of the carriage; and a first circuit board having a transmitter circuit and/or a receiver circuit, the first circuit board being attached to the central portion of the carriage;
wherein the gimbal assembly is attached to a pivotable portion of the electronic device,
wherein the carriage includes surfaces defining a recessed cut-out portion to receive the first circuit board, and surfaces defining at least one hole are boated adjacent to the recessed cut-out portion to accommodate the first magnet, and
wherein the first portion comprises a display and the second portion comprises a base.

15. The gimbal assembly of claim 14, wherein the first and second bearings are roller bearings and the gimbal pivots are part of spindles.

16. The gimbal assembly of claim 14, further comprising a second circuit board having a receiver circuit and/or a transmitter circuit, the second circuit board being attached to that portion of the electronic device to which the gimbal assembly is not attached.

17. The gimbal assembly of claim 14, comprising a second magnet arranged on a portion of the electronic device so as to permit an attractive magnetic force between the first magnet and the second magnet capable of rotating the carriage.

18. An apparatus to enable a wireless connection between a relatively pivotable first portion and second portion of a computer system, comprising:
a carriage pivotally attached to the first portion of the computer system about gimbal axis;
a receiver circuit and a transmitter circuit that are attached the carriage;
a transmitter circuit and a receiver circuit that are attached to the second portion of the computer system;
at least one magnet and/or a magnetic material attached to the carriage;
at least one magnet and/or a magnetic material attached to the second portion so that there exists a magnetic attraction urging the carriage towards the second portion, and wherein the carriage includes surfaces defining a recessed cut-out portion to receive a circuit board, and surfaces defining at least one hole are located adjacent to the recessed cut-out portion to accommodate one or more of the at least one magnet or a magnetic material attached to the carriage,
wherein the carriage comprises a central portion bound by ring portions, and
wherein the first portion comprises a display and the second portion comprises a base.

19. The apparatus of claim 18, wherein the receiver circuit and the transmitter circuit of the carriage are so positioned on the carriage that the receiver circuit and the transmitter circuit face the receiver and transmitter circuits of the second portion.

20. A method of manufacturing a device, comprising:
providing a first magnet, a first transmitter, and a first receiver on a carriage that has a gimbal connection with respect to a first pivotable section; and
attaching a second magnet, a second transmitter, and a second receiver to a second pivotable section, wherein an attractive force between the first magnet and the second magnet brings the first receiver, the first transmitter, the second receiver and the second transmitter into line-of-sight alignment with one another,
wherein the carriage includes surfaces defining a recessed cut-out portion to receive a circuit board, and surfaces defining at least one hole are located adjacent to the recessed cut-out portion to accommodate the first magnet,
wherein the carriage comprises a central portion bound by ring portions, and
wherein the first pivotable section comprises a display and the second pivotable section comprises a base.

21. The method of claim 20, wherein the carriage has a center of mass and is pivotable about an axis that is displaced from the center of mass.

22. The method of claim 20, wherein magnetic forces bring at least one transmitter and at least one receiver into line-of-sight alignment with one another.

23. The method of claim 20, further comprising providing bearings to facilitate rotation of the carriage.

24. The method of claim 23, wherein the bearings are roller bearings.

25. The method of claim 20, wherein the device comprises a tablet and a detachable base.

* * * * *

UNITED STATES PATENT AND TRADEMARK OFFICE
CERTIFICATE OF CORRECTION

PATENT NO. : 10,088,864 B2
APPLICATION NO. : 14/497534
DATED : October 2, 2018
INVENTOR(S) : Russell S. Aoki et al.

Page 1 of 1

It is certified that error appears in the above-identified patent and that said Letters Patent is hereby corrected as shown below:

On the Title Page

Item (72) at Column 1, Line number 2, delete "Beaverton," and insert --Portland,-- therefor In the Claims At Column 9, Claim number 14, Line number 48, after "of", delete "boated" and insert --located-- therefor At Column 10, Claim number 18, Line number 5, after "about", insert --a--

Signed and Sealed this
Eleventh Day of December, 2018

Andrei Iancu
*Director of the United States Patent and Trademark Office*